(12) United States Patent
Robbins (10) Patent No.: US 7,028,639 B2
(45) Date of Patent: Apr. 18, 2006

(54) PRECONDITIONING A WILDLIFE FORAGING AREA

(75) Inventor: Mark A. Robbins, Sturgis, SD (US)

(73) Assignee: Ridley Block Operations, Inc., Mankato, MN (US)

( * ) Notice: Subject to any disclaimer, the term of this patent is extended or adjusted under 35 U.S.C. 154(b) by 194 days.

(21) Appl. No.: 10/626,293

(22) Filed: Jul. 24, 2003

(65) Prior Publication Data

US 2005/0081792 A1  Apr. 21, 2005

Related U.S. Application Data

(60) Continuation-in-part of application No. 10/395,532, filed on Mar. 24, 2003, which is a continuation of application No. 10/059,806, filed on Jan. 28, 2002, now Pat. No. 6,561,133, which is a continuation of application No. 09/745,609, filed on Dec. 21, 2000, now Pat. No. 6,390,024, which is a division of application No. 09/266,176, filed on Mar. 10, 1999, now Pat. No. 6,244,217.

(51) Int. Cl.
*A01K 29/00* (2006.01)
*A01K 39/01* (2006.01)

(52) U.S. Cl. .................... 119/712; 119/174

(58) Field of Classification Search .......... 119/51.01, 119/51.03, 52.4, 57.8, 61, 174, 666, 51.08; D1/100; 426/1, 250, 635, 805, 807

See application file for complete search history.

(56) References Cited

U.S. PATENT DOCUMENTS

| D61,520 S | 9/1922 | Michalski |
| 2,576,154 A | 11/1951 | Trautvetter |
| 2,801,609 A | 8/1957 | Webster |
| 3,259,106 A | 7/1966 | Ray et al. |
| 3,500,795 A | 3/1970 | Towlerton |
| 3,972,307 A | 8/1976 | Marseillan |
| 4,329,940 A | 5/1982 | Humphries |
| 4,338,336 A | 7/1982 | Glabe et al. |
| 4,463,706 A | 8/1984 | Meister et al. |

(Continued)

OTHER PUBLICATIONS

"Influence of Liquid Supplement Delivery Method on Forage and Supplement Intake of Grazing Beef Cows" by Bowman et al; Animal Feed Science and Technology; 78 (3-4) 273-285; 1999.*

(Continued)

*Primary Examiner*—Teri Pham Luu
*Assistant Examiner*—Elizabeth Shaw
(74) *Attorney, Agent, or Firm*—Dorsey & Whitney LLP (57) ABSTRACT

The present invention, in one embodiment, is a method of using a plurality of domestic ungulates to precondition a foraging area to enhance the attractiveness of the foraging area to a plurality of wild ungulates. The method comprises selecting the foraging area to be preconditioned, selecting a target period, selecting a preconditioning period, and providing at least one highly palatable, portable, self-limiting, animal feed supplement in the foraging area during the preconditioning period. The target period is when the plurality of wild ungulates uses the foraging area once it has been preconditioned. The preconditioning period is when the plurality of domesticated ungulates preconditions (i.e., forages) the foraging area for use by the wild ungulates during the target period. The highly palatable, portable, self-limiting, animal feed supplement attracts the plurality of domesticated ungulates to the foraging area and increases the length of stay of the plurality of domesticated ungulates in the foraging area.

37 Claims, 9 Drawing Sheets

U.S. PATENT DOCUMENTS

| | | | |
|---|---|---|---|
| 4,784,086 A | | 11/1988 | Hand et al. |
| 4,986,220 A | | 1/1991 | Reneau et al. |
| 5,050,539 A | * | 9/1991 | Liegner .................... 119/666 |
| 5,406,909 A | | 4/1995 | Wenstrand |
| 5,526,773 A | | 6/1996 | Richardson |
| 5,572,954 A | | 11/1996 | Elkins |
| 5,622,739 A | | 4/1997 | Benton et al. |
| 5,637,312 A | | 6/1997 | Tock et al. |
| 5,758,598 A | | 6/1998 | Rothert |
| 5,862,777 A | | 1/1999 | Sweeney |
| 5,901,660 A | | 5/1999 | Stein |
| 6,117,458 A | | 9/2000 | Morgan |
| 6,153,230 A | | 11/2000 | Corley, Jr. |
| 6,244,217 B1 | * | 6/2001 | Robbins .................... 119/174 |
| 6,257,288 B1 | | 7/2001 | Davidian et al. |
| 6,390,024 B1 | * | 5/2002 | Robbins .................... 119/174 |
| 6,561,133 B1 | * | 5/2003 | Robbins .................... 119/174 |
| 6,854,420 B1 | | 2/2005 | Crocker |
| 2003/0188694 A1 | | 10/2003 | Robbins |

OTHER PUBLICATIONS

"A Way of Recovering Woodland and Healthland for Pastoral Farming ina Game and Wildlife Reserve Area" by Aussibal et al; Rencontres autour des Recherches sur les Ruminants, Paris, France; p. 399-402; Dec. 4-5 2002.*
Crystalyx Brand Supplements brochure, pp. 1-15.
Beef NutriTech, New Tools to Distribute Grazing brochure.
Crystalyx Brand Supplements, Dealer Reference Manual, BGF-30.
Pasture and Forages, *Modifying livestock grazing distribution by strategic placement of cooked molasses supplements*, D.W. Bailey and G.R. Welling, Montana State University, Havre, J. Anim. Sci. vol. 76, Suppl. 1/J. Dairy Sci. vol. 81, Suppl. 1/1998, 740, p. 191.
*Cattle Grazing and Behavior on a Forested Range*, Leonard Roy Roath and William C. Krueger, Journal of Range Management 35(3), May 1982, pp. 332-338.
*Cattle Distribution on Mountain Rangeland in Northeastern Oregon*, R.L. Gillen, W.C. Krueger, and R.F. Miller, Journal of Range Management 37(6), Nov. 1984, pp. 549-553.
*Salt and Meal-Salt Help Distribute Cattle Use on Semidesert Range*, S. Clark Martin and Donald E. Ward, Journal of Range Management 26(2), Mar. 1973, pp. 94-97.
*Response of Livestock to Riparian Zone Exclusion*, Larry D. Bryant, Journal of Range Management 35(6), Nov. 1982, pp. 780-785, pp. 780-785.
*Management of Cattle Distribution*, Derek W. Bailey and Larry R. Rittenhouse, Rangelands 11(4), Aug. 1989, pp. 159-161.
*An Approach for Setting the Stocking Rate*, Jerry L. Holechek, Rangelands 10(1), Feb. 1988, pp. 10-14.
*Declining forage availability effects on utilization and community selection by cattle*, Michael A. Smith, J. Daniel Rodgers, Jerrold L. Dodd, and Quentin D. Skinner, J. Range Manage, 45:391-395, Jul. 1992.
*Impacts of Cattle on Strambanks in Northeastern Oregon*, J. Boone Kauffman, W.C. Krueger, and M. Vavra, Journal of Range Management 36(6), Nov. 1983, pp. 683-685.
*Livestock Impacts on Riparian Ecosystems and Streamside Management Implications . . . A Review*, J. Boone Kauffman and W.C. Krueger, Journal of Range Management 37(5), Sep. 1984, pp. 430-438.
*Factors Affecting Utilization of Mountain Slopes By Cattle*, C. Wayne Cook, Dept. of Range Science, Utah State University, Logan, pp. 200-204.
*Use of Supplemental Feeding Locations to Manage Cattle Use on Riparian Areas of Hardwood Rangelands*, Neil K. McDougald, William E. Frost, and Dennis E. Jones, USDA Forest Service Gen. Tech. Rep. PSW-110, 1989, pp. 124-126.
*Grazing Management*, John F. Vallentine, Professor of Range Science, Brigham Young University, Provo, Utah, 1990, pp. 76-105.
*Rangeland Management for Livestock Production*, Hershel M. Bell, University of Oklahoma, 1973, pp. 190-216.
*Holistic Resource Management*, Allan Savory, Library of Congress Cataloging-in-Publication Data, 1988, pp. 250-263.
*Managing Livestock Grazing on Meadows of California's Sierra Nevada*, A Manager-User Guide, Univ. Calif., Div. Agric. & Nat. Resources Leaflet 21421, pp. 1-9.
U.S. Forest Service Rocky Mountain Forest and Range Experiment Station, 1980, Utilization Gauge, An Instrument for Measuring the Utilization of Grasses, American Slide-Chart Corp., Wheaton, III., 3 pgs.
*Managing Livestock Grazing on Meadows of California's Sierra Nevada*, A Manager-User Guide, Cooperative Extension University of California, Division of Agriculture and Natural Resources, Leaflet 21421.
Warnert, Jeannette, "UC Scientists Use Observation to Study Cow Behavior", [on line], Aug. 10, 1998, http://www.uckac.ed/press/pressreleases98/cowbehavior.htm (2pgs).
"Cow behavior studied to protect environment", [on line], Aug. 18, 1998, http://www.enn.com/news/enn-stories/1998/08/081898/cows17_23073.asp, (2pgs).
Crane, K.K., et al., *Influence of Cattle Grazing on Elk Habitat Selection*, Proceedings, Western Section American Society of Animal Science, vol. 52, 2001, (5pgs).
George et al., "Practices and Strategies for Reducing Nonpoint Source Pollution and Protecting Biodiversity", http://agronomy.ucdavis.edu/CALRNG/Project%20Descriptions/Practices.htm., 4 pgs, Copyright 1998.

* cited by examiner

PRECONDITIONING A WILDLIFE FORAGING AREA

CROSS-REFERENCE TO RELATED APPLICATIONS

This application is a continuation-in-part (CIP) application of U.S. patent application Ser. No. 10/395,532, filed Mar. 24, 2003, which is a continuation of U.S. patent application Ser. No. 10/059,806, filed Jan. 28, 2002 now U.S. Pat. No. 6,561,133, which is a continuation of U.S. patent application Ser. No. 09/745,609, filed Dec. 21, 2000 and issued May 21, 2002 as U.S. Pat. No. 6,390,024, which is divisional of U.S. patent application Ser. No. 09/266,176, filed Mar. 10, 1999 and issued Jun. 12, 2001 as U.S. Pat. No. 6,244,217, which are all hereby incorporated by reference in their entireties.

BACKGROUND OF THE INVENTION

The present invention relates generally to a method of managing foraging areas. More particularly, the present invention relates to a method of using an animal feed supplement to manage foraging areas.

Wild ungulates, such as elk, deer, bison, etc., forage where they find foraging conditions to be most suitable. Consequently, the natural foraging distribution of wild ungulates may encompass some foraging areas and not others. Thus, some foraging areas will have many wild ungulates, while other foraging areas will have few or none.

Individuals and groups, such as ranchers, farmers, wildlife enthusiasts, environmentalists, state and national wildlife agencies, and state and national land management agencies, concern themselves with the natural foraging distribution of wild ungulates in various foraging areas. For example, farmers prefer that the foraging distribution of wild ungulates does not encompass their fields when their crops are first sprouting in the springtime. To prevent the transmission of disease from wild ungulates to livestock, as can occur between bison infected with brucellosis and cattle, ranchers prefer that the foraging distribution of wild ungulates does not encompass the grazing area of their livestock. Wildlife enthusiasts and park managers prefer that the foraging distribution of wild ungulates encompasses less remote areas to facilitate the viewing of wild ungulates, thereby increasing appreciation for wild ungulates and nature.

There is a need in the art for a method of modifying the natural foraging distribution of wild ungulates.

BRIEF SUMMARY OF THE INVENTION

The present invention, in one embodiment, is a method of using a plurality of domestic ungulates to precondition a foraging area to enhance the attractiveness of the foraging area to a plurality of wild ungulates. The method comprises selecting the foraging area to be preconditioned, selecting a target period, selecting a preconditioning period, and providing at least one highly palatable, portable, self-limiting, animal feed supplement in the foraging area during the preconditioning phase. The target period is when the plurality of wild ungulates uses the foraging area once it has been preconditioned by the domestic ungulates. The preconditioning period is when the plurality of domesticated ungulates preconditions (i.e., forages in) the foraging area for subsequent use by the wild ungulates during the target period. The highly palatable, portable, self-limiting, animal feed supplement attracts the plurality of domesticated ungulates to the foraging area and increases the length of stay of the plurality of domesticated ungulates in the foraging area.

During the preconditioning period, when the domesticated ungulates forage in the foraging area, the domesticated ungulates remove the old forage and deposit manure throughout the foraging area. Because the old forage has been removed, the ratio of new forage to old forage is increased after a subsequent growth period. Also, because manure has been distributed throughout the foraging area, the new forage grows more vigorously during a subsequent growth period. As a result, because of the preconditioning, the foraging area ends up being more attractive to wild ungulates than it would otherwise be without preconditioning.

The present invention, in another embodiment, is a method of modifying a wild ungulate foraging distribution. The method comprises selecting a foraging area to be encompassed by the wild ungulate foraging distribution and supplying in the foraging area an ingestible adapted to be ingested by a preconditioning ungulate. The ingestible attracts the preconditioning ungulate to the foraging area and increases the dwell time of the preconditioning ungulate within the foraging area. In one embodiment, the preconditioning ungulates may be cattle, sheep, goats, lamas or horses. In another embodiment, the preconditioning ungulates may be domesticated or semi-domesticated elk, deer, bison or wild horses. In one embodiment, the wild ungulates may be elk, deer, bison or wild horses.

The present invention, in another embodiment, is a preconditioned foraging area enhanced by a domestic ungulate to be more attractive to a wild ungulate. The foraging area comprises a foraging area and a highly palatable, portable, self-limiting, animal feed supplement located in the foraging area. The animal feed supplement is adapted to attract the domestic ungulate to the foraging area and to increase a length of stay of the domestic ungulate in the foraging area.

The present invention, in another embodiment, is a preconditioned forage area attractive to wild ungulates as a source of young growth forage. The preconditioned forage area has a predetermined grazing level produced by providing at least one highly palatable, portable, self-limiting, animal feed supplement in the preconditioned foraging area. The preconditioned foraging area is accessible to wild ungulates but distinct from foraging areas habitually frequented by such wild ungulates. The at least one animal feed supplement is provided in the preconditioned foraging area in advance of a forage growing season and for a period of time sufficient for a plurality of domesticated ungulates to precondition the foraging area. The at least one animal feed supplement is adapted to attract the plurality of domesticated ungulates to the preconditioned foraging area and to increase a length of stay of the domesticated ungulates in the preconditioned foraging area.

While multiple embodiments are disclosed, still other embodiments of the present invention will become apparent to those skilled in the art from the following detailed description, which shows and describes illustrative embodiments of the invention. As will be realized, the invention is capable of modifications in various obvious aspects, all without departing from the spirit and scope of the present invention. Accordingly, the drawings and detailed description are to be regarded as illustrative in nature and not restrictive.

DETAILED DESCRIPTION

This specification discloses a method of modifying the natural foraging distribution of wild ungulates. Specifically, the method entails preconditioning a foraging area with domesticated ungulates to enhance its attractiveness to wild ungulates, thereby shifting the wild ungulate foraging distribution ("WUF distribution") to encompass the preconditioned foraging area.

Figure 1:
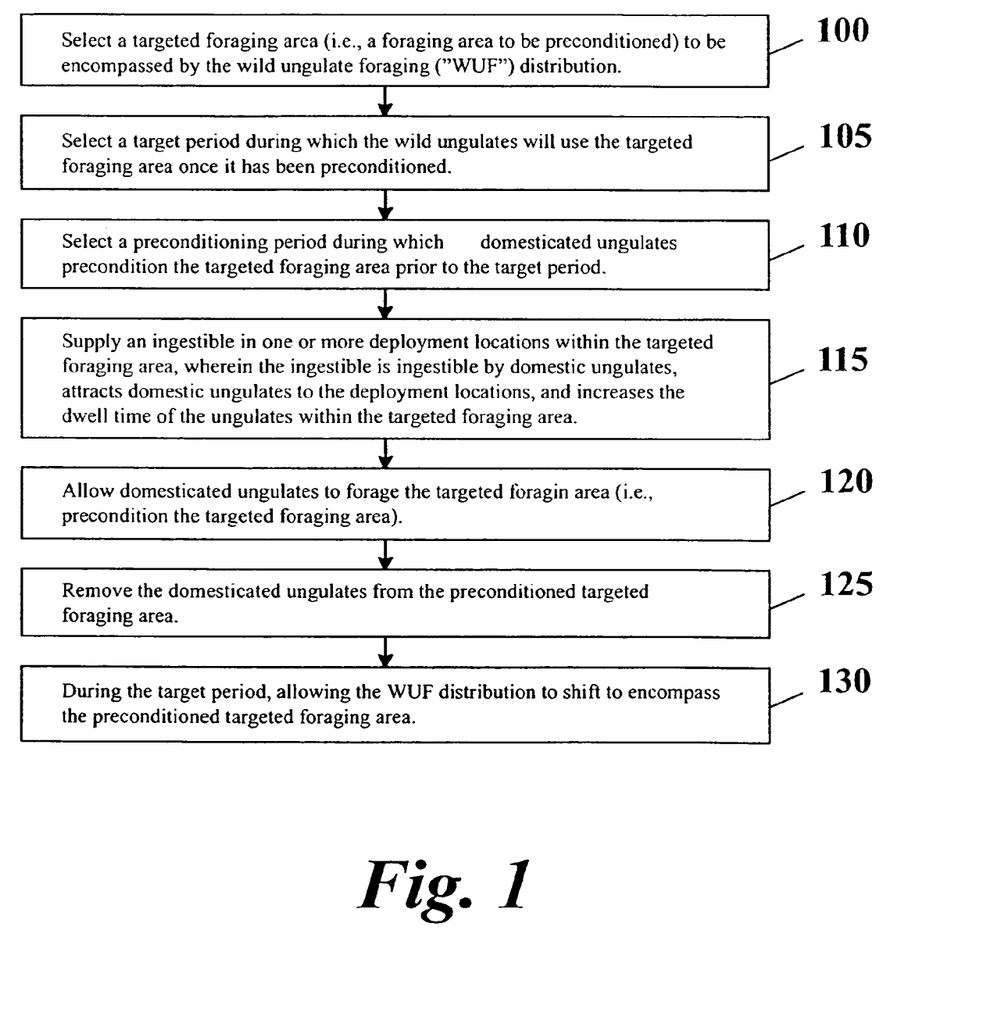
FIG. 1 is a flow diagram illustrating one embodiment of the method.

As indicated in FIG. 1 and as will be explained in greater detail later in this specification, the method, in one embodiment, is as follows. A foraging area is selected to be encompassed by the WUF distribution (block 100). This foraging area becomes the targeted foraging area (i.e., the foraging area to be preconditioned). A target period is selected during which the wild ungulates will use the targeted foraging area once it has been preconditioned (block 105). A preconditioning period is selected during which domesticated ungulates precondition the targeted foraging area prior to the target period (block 110). During the preconditioning period, an ingestible is supplied in one or more deployment locations within the targeted foraging area, and domesticated ungulates forage the targeted foraging area (blocks 115 and 120). The ingestible is ingestible by domestic ungulates, attracts domestic ungulates to the deployment locations, and increases the dwell time of the domestic ungulates within the targeted foraging area. After the preconditioning is completed, the domestic ungulates may be removed from the targeted foraging area (block 125). During the target period, the WUF distribution shifts to encompass the targeted foraging area, which has been preconditioned by the domestic ungulates' foraging (block 130). The WUF distribution shifts because of the wild ungulates' preference for the preconditioned forage, in particular, the young, fresh growth that follows grazing of old, cured forage.

Figure 2:
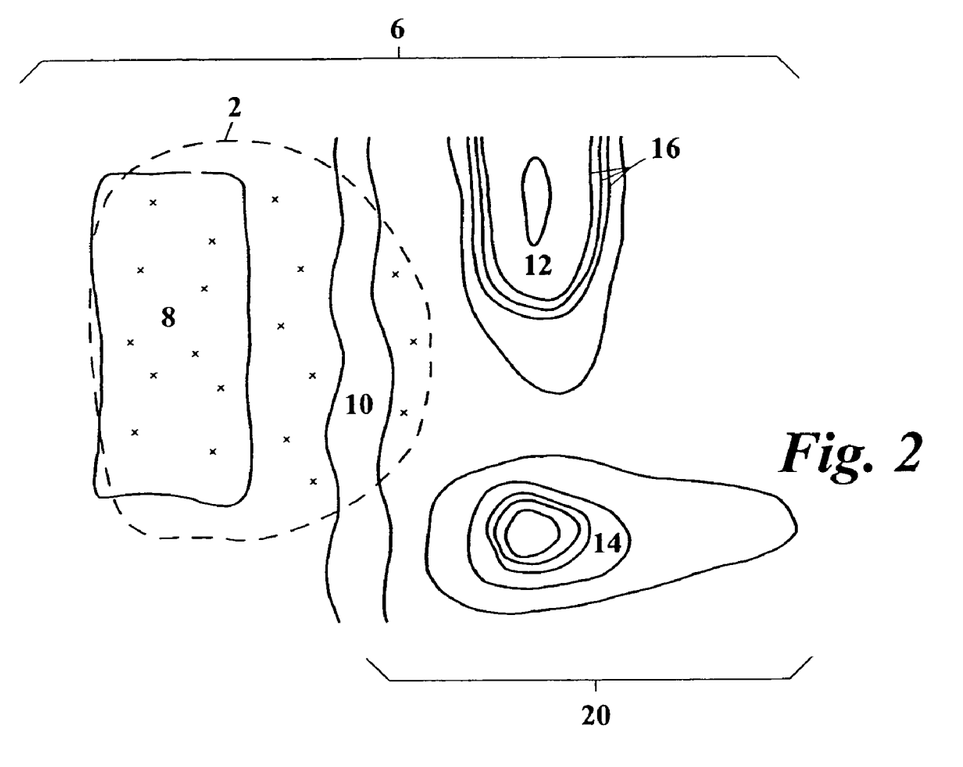
FIG. 2 is a topographic map showing the unmodified natural wild ungulate foraging distribution in a foraging area in the springtime.

The method, in one embodiment, will now be explained by referring to a series of topographical maps (FIGS. 2, 3 and 4) that illustrate how the WUF distribution is shifted away from a field, thereby reducing wild ungulate foraging pressure ("WUF pressure") on the field in the springtime. FIG. 2 is a topographic map showing the unmodified natural WUF distribution 2 (shown in phantom) in a foraging area 6 in the springtime.

Figure 3:
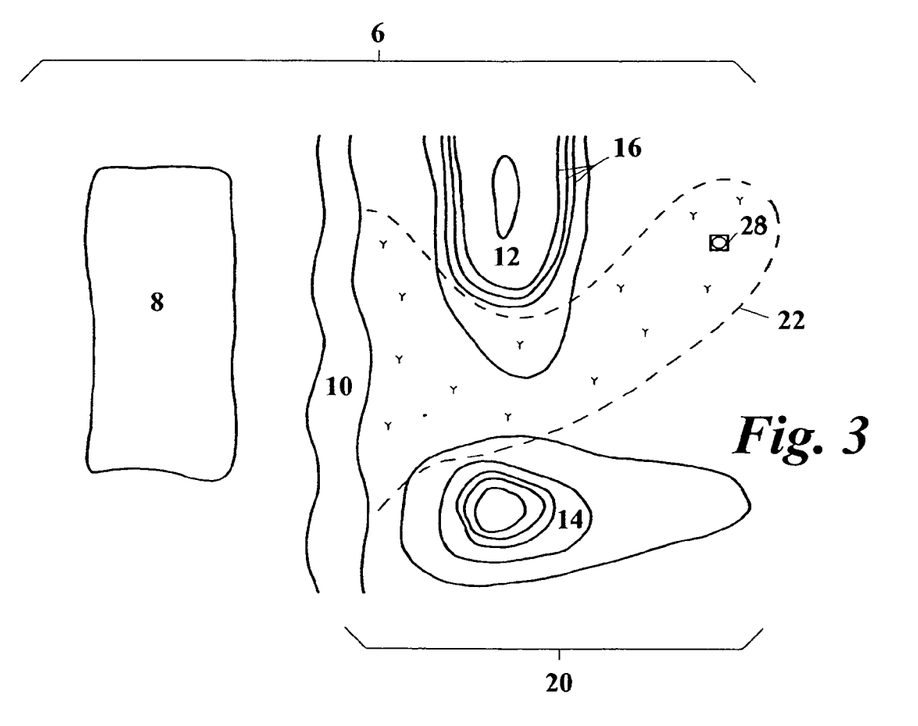
FIG. 3 is a topographic map of the foraging area depicted in FIG. 2, shown during a later preconditioning period.

FIG. 3 is a topographic map of the foraging area 6 depicted in FIG. 2, shown during a later preconditioning period. Specifically, FIG. 3 shows the preconditioned forage area 22 (shown in phantom) created by domestic ungulates Y. The domestic ungulates Y are drawn to an ingestible, which is supplied in at least one deployment location 28 during the preconditioning period.

Figure 4:
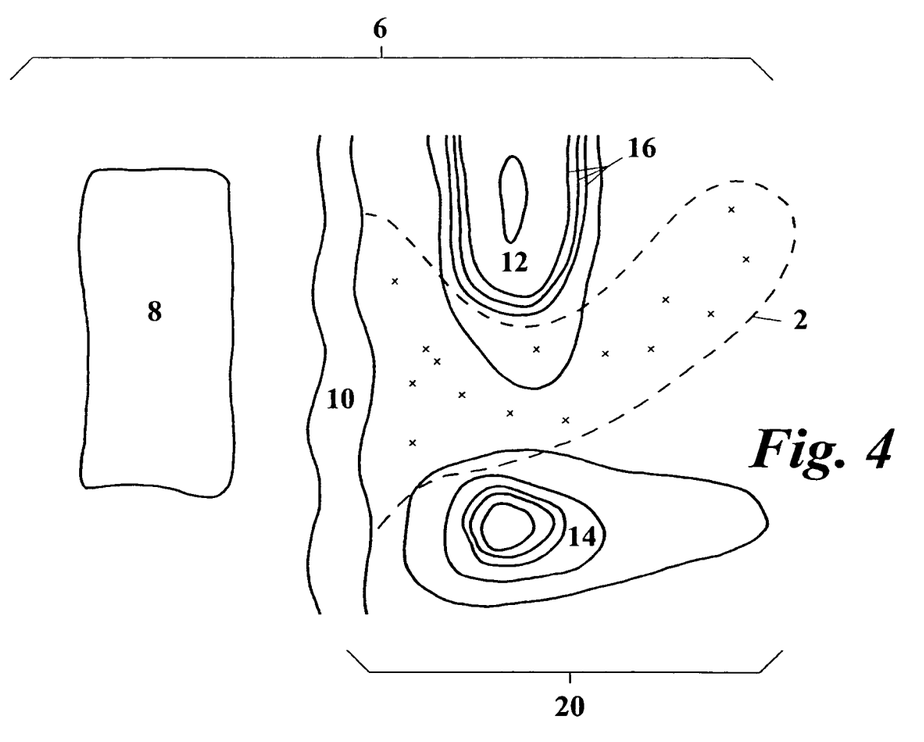
FIG. 4 is a topographical map of the foraging area depicted in FIGS. 2 and 3, shown during a later target period.

FIG. 4 is a topographical map of the foraging area 6 depicted in FIGS. 2 and 3, shown during a later target period. Specifically, FIG. 4 shows the modified WUF distribution 2 (shown in phantom) that results from preconditioning of the foraging area 6.

As illustrated in FIG. 2, the foraging area 6 includes a cultivated field 8, a stream 10, steep hills 12, 14, and a non-field area 20 that has undergone little, if any, grazing by domestic ungulates Y during the previous season. The location and grade of the hills 12, 14 are indicated by contour lines 16. The foraging area 6 may be prairie, foothills, mountains, forest, desert, etc., or any combination of these types of foraging environments.

Since FIG. 2 depicts springtime conditions, the field 8 has young, tender sprouting plants and the non-field area 20 has old cured forage from the previous season. As can be understood by those skilled in the art, wild ungulates X typically prefer grazing young, tender sprouting forage over grazing old, cured forage. Thus, as indicated in FIG. 2, the natural WUF distribution 2 encompasses the field 8 and the areas immediately adjacent to the stream 10 and excludes the non-field area 20. Thus, the field 8 is under substantial WUF pressure.

A foraging area manager, such as a farmer, rancher or public land manager, determines that the natural WUF distribution 2 should be shifted via preconditioning of a targeted foraging area 22 so WUF pressure on the field 8 is reduced the following spring. Thus, the target period during which the wild ungulates X will use the targeted (i.e., preconditioned) foraging area becomes the following spring (block 105 of FIG. 1).

As indicated in FIG. 3, the foraging area manager inspects the foraging area 6 to select a deployment location 28 that will facilitate the creation of a targeted (i.e., preconditioned) foraging area 22 (shown in phantom) that will adequately shift the WUF distribution 2 the following spring (block 100 of FIG. 1). The targeted foraging area 22 will be more effective in shifting the WUF distribution 2 away from the field 8 when consideration is given to the relationship between the deployment location 28 and the foraging area's topography and water supply locations. For example, as shown in FIG. 3, the deployment location 28 is separated from the stream 10 by hills 12, 14 and significant distance. Thus, during the precondition period, as domesticated ungulates Y forage between the stream 10 and the deployment location 28, they will create a preconditioned foraging area 22 that is large and roughly bounded by the hills 12, 14 and the stream 10. As shown in FIG. 3, the preconditioned foraging area 22 also has the advantage of being on the opposite side of the stream 10 from the field 8. Thus, during the target period, wild ungulates X can forage the preconditioned foraging area 22 and access the stream 8 without having to travel near the field 8.

Still referring to FIG. 3, the foraging area manager determines the proper preconditioning period for the agriculture operation is fall (block 110 of FIG. 1) because the field 8 will be free of its crop, and the forage in the non-field area 20 will be cured. Thus, the domestic ungulates Y, when preconditioning the targeted foraging area 22, will be able to remove the old, cured forage without harming any crops in the field 8.

As illustrated in FIG. 3, during the preconditioning period, an ingestible is supplied in one or more deployment locations 28 within the targeted foraging area 22 to which the domesticated ungulates Y are to be located (block 115 of FIG. 1). The domesticated ungulates Y then forage (i.e., precondition) the targeted foraging area 22 (block 120 of FIG. 1) to remove the old, cured forage.

For the purpose of this specification, an ingestible is any substance meant to be ingested by domestic ungulates Y. For example, an ingestible could be water, livestock cake, beet pulp, silage, hay, straw, grain, chemically hardened blocks, protein blocks, pressed blocks, liquid or granular feed supplements, mineral blocks, granular mineral supplements, salt blocks, granular salt supplements, or a highly-palatable, portable, self-limiting, animal feed supplement of the type described later in this specification. The ingestible will attract the domestic ungulates Y to the one or more deployment locations 28. The ingestible will also increase the presence (i.e., dwell time) of the domestic ungulates Y within the targeted foraging area 22. As a result, the domestic ungulates may consume all, or most of, the old, cured forage. Additionally, during the preconditioning period, the domestic ungulates deposit manure to facilitate the next growing season.

As shown in FIG. 4, when the target period has arrived, which in this example is the spring following the fall preconditioning period, the WUF distribution 2 shifts away from the field 8 to encompass the targeted (i.e., preconditioned) foraging area 22 (block 130 of FIG. 1). This is because the preconditioned foraging area 22 has young, tender sprouting plants, the old, cured forage having been removed by the domestic ungulates Y during the fall preconditioning period. The WUF distribution shifts from the field to the targeted foraging area 22 because of the wild ungulates' preference for preconditioned forage.

Wild ungulates' preference for forage that has been preconditioned by domestic ungulates Y is supported by a study entitled, Influence of Cattle Grazing On Elk Forage Conditions and Habitat Selection, K. K. Crane, et al., Proceedings, Western Section, American Society of Animal Science, Vol. 52 (2001), which is hereby incorporated by reference in its entirety. The study results indicate that elk (i.e., wild ungulates X) avoided areas where cattle (i.e., domestic ungulates Y) had not grazed during the preceding summer. The study results also indicated that elk preferred to forage in the winter and fall where cattle had lightly or moderately grazed the preceding summer. Finally, the study results indicated that elk strongly preferred to forage in the spring where cattle had grazed moderately during the preceding summer.

Figure 5:
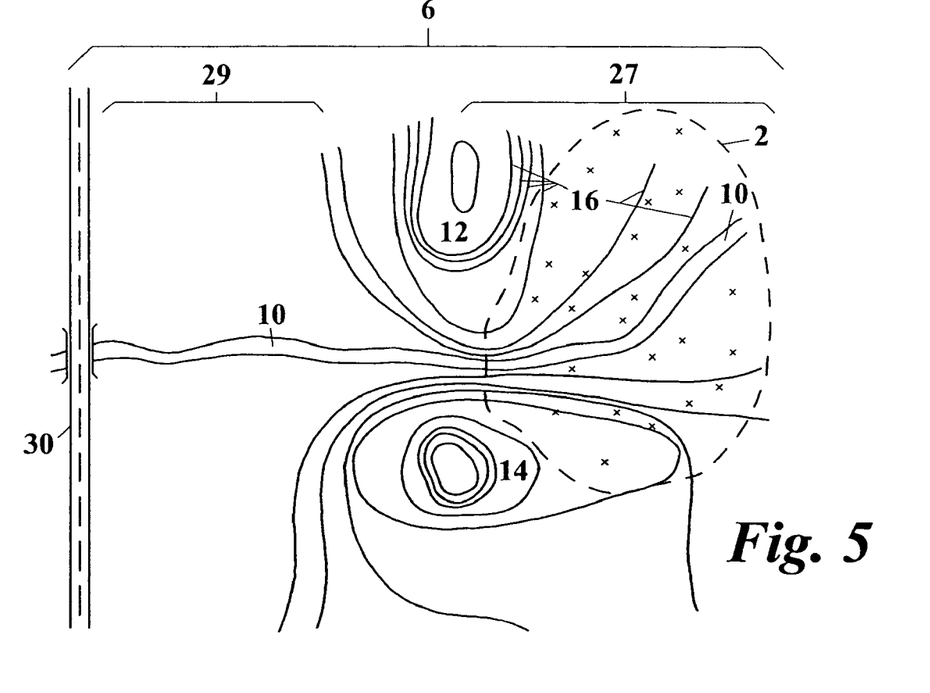
FIG. 5 is a topographic map showing the unmodified natural wild ungulate foraging distribution in a foraging area.

The method, in another embodiment, will now be explained by referring to a series of topographical maps (FIGS. 5, 6 and 7) that illustrate how the WUF distribution 2 is shifted away from a remote high elevation foraging area 27 to a low elevation foraging area 29 near a road 30. FIG. 5 is a topographic map showing the unmodified natural WUF distribution 2 (shown in phantom) in a foraging area 6.

Figure 6:
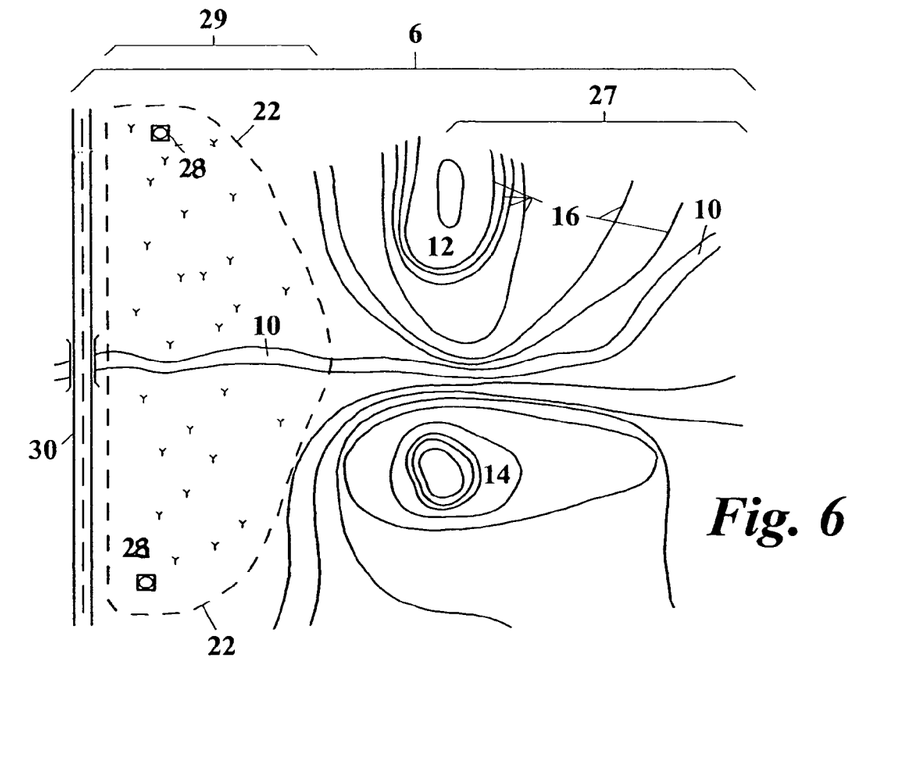
FIG. 6 is a topographic map of the foraging area depicted in FIG. 5, shown during a later preconditioning period.

FIG. 6 is a topographical map of the foraging area 6 depicted in FIG. 5, shown during a later preconditioning period. Specifically, FIG. 6 shows the preconditioned forage area 22 (shown in phantom) created by domestic ungulates Y. The domestic ungulates Y are drawn to an ingestible, which is supplied in at least one deployment location 28 during the preconditioning period.

Figure 7:
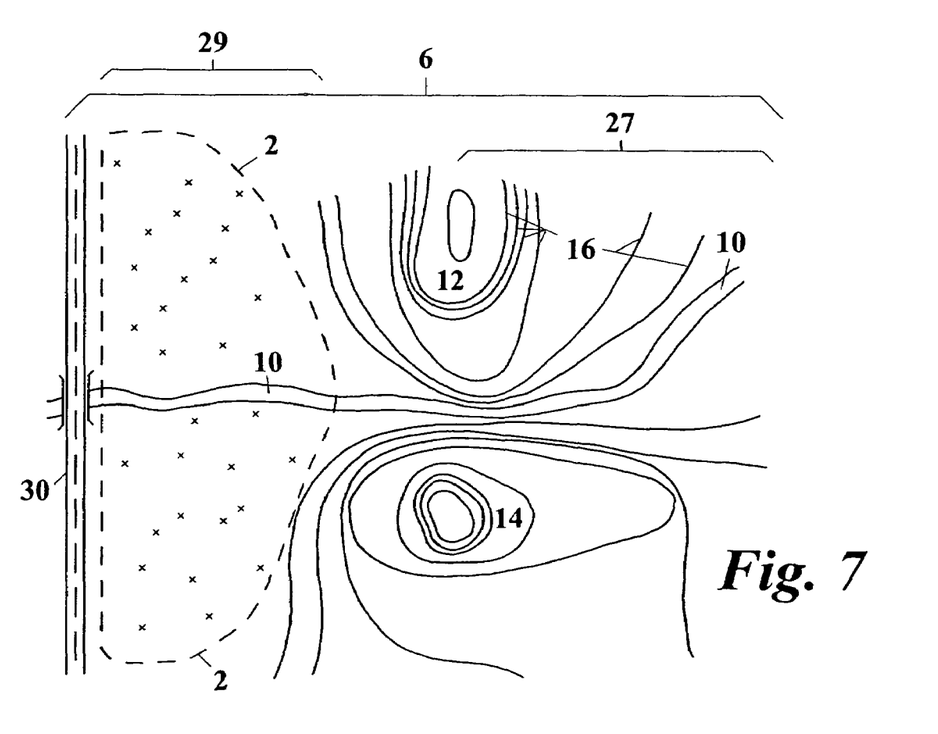
FIG. 7 is a topographical map of the foraging area depicted in FIGS. 5 and 6, shown during a later target period.

FIG. 7 is a topographical map of the foraging area 6 depicted in FIGS. 5 and 6, shown during a later target period. Specifically, FIG. 7 shows the modified WUF distribution 2 (shown in phantom) that results from preconditioning of the foraging area 6.

As illustrated in FIG. 5, the foraging area 6 includes a stream 10, steep hills 12, 14, and a road 30. The low elevation foraging area 29 near the road 30 has undergone little, if any, grazing by domestic ungulates Y during the previous season. The location and grade of the hills 12, 14 are indicated by contour lines 16. The foraging area 6 may be prairie, foothills, mountains, forest, desert, etc., or any combination of these types of foraging environments.

FIG. 5 depicts conditions when the wild ungulates X are foraging in the remote high elevation foraging area 27 and avoiding foraging in the low elevation foraging area 29 near the road 30. As can be understood by those skilled in the art, wild ungulates X typically migrate to foraging areas that are remote from the pressures of human civilization. Thus, as indicated in FIG. 5, the natural WUF distribution 2 encompasses the remote high elevation foraging area 27 and excludes the low elevation foraging area 29 near the road 30. This natural WUF distribution 2 can arise at different times of the year for different reasons. For example, pressure from hunters will cause the natural WUF distribution 2 to shift to the remote high elevation foraging area 27 in the fall. Similarly, in national parks, hot weather and pressure from tourists will cause the natural WUF distribution 2 to shift to the remote high elevation foraging area 27 in the summer.

A foraging area manager, such as a public land manager, determines that the natural WUF distribution 2 should be shifted via preconditioning of a targeted foraging area 22 to increase the presence of the wild ungulates X in the low elevation foraging area 29 near the road 30. If the land manager is trying to increase the presence of the wild ungulates X in the low elevation foraging area 29 to allow tourists the opportunity to see wild ungulates X during the summer months, then the target period during which the wild ungulates X will use the targeted (i.e., preconditioned) foraging area 22 becomes the summer (block 105 of FIG. 1). If the land manager is trying to increase the presence of rutting elk or deer (i.e., wild ungulates X) in the low elevation foraging area 29 to allow photographers increased opportunity to photograph the elk or deer during the fall rut, then the target period during which the rutting elk or deer (i.e., wild ungulates X) will use the targeted (i.e., preconditioned) foraging area 22 becomes the fall (block 105 of FIG. 1).

As indicated in FIG. 6, the foraging area manager inspects the foraging area 6 to select deployment locations 28 that will facilitate the creation of a targeted (i.e., preconditioned) foraging area 22 (shown in phantom) that will adequately shift the WUF distribution 2 from the remote high elevation foraging area 27 to the low elevation foraging area 29 (block 100 of FIG. 1). The targeted foraging area 22 will be more effective in shifting the WUF distribution 2 when consideration is given to the relationship between the deployment locations 28 and the foraging area's topography and water supply locations. For example, as shown in FIG. 5, each deployment location 28 is near the road 30 and is approximately equal in distance from the stream 10. Thus, during the precondition period, as domesticated ungulates Y forage between the stream 10 and the deployment locations 28, they will create a preconditioned foraging area 22 that is large and bounded by the hills 12, 14 and the road 30.

Still referring to FIG. 6, the foraging area manager determines the proper preconditioning period for the tourist scenario is fall (block 110 of FIG. 1) because tourists will not be present, wild ungulates X will not be giving birth in the low elevation foraging area 29 as they may in the spring, and forage in the low elevation foraging area 29 will be cured. Thus, the domestic ungulates Y, when preconditioning the targeted foraging area 22, will be able to remove the old cured forage with the least amount of adverse impact possible. In the wildlife photography scenario, the foraging manager determines the proper preconditioning period is summer (block 110 of FIG. 1) because wild ungulates X will not be giving birth in the low elevation foraging area 29, and the forage in the low elevation foraging area 29 will be cured. The removal of old cured forage prior to fall and the reception of early fall moisture can result in new, fresh forage growth in the fall, which the wild ungulates X find enticing.

As illustrated in FIG. 6, during the preconditioning period, an ingestible is supplied in one or more deployment locations 28 within the targeted foraging area 22 wherein the domesticated ungulates Y are then located (block 115 of FIG. 1). The domesticated ungulates Y then forage (i.e., precondition) the targeted foraging area 22 (block 120 of FIG. 1) to remove the old, cured forage. As previously stated, for the purposes of this specification, an ingestible is any substance meant to be ingested by domestic ungulates Y, that will attract the domestic ungulates Y to the one or more deployment locations 28, and that will also increase the presence (i.e., dwell time) of the domestic ungulates Y within the targeted foraging area 22.

As shown in FIG. 7, when the target period has arrived, which in the tourist scenario is the summer following the fall preconditioning period and in the wildlife photography scenario is the fall following the summer preconditioning period, the WUF distribution 2 has shifted away from the remote high elevation foraging area 27 to encompass the targeted (i.e., preconditioned) foraging area 22 (block 130 of FIG. 1). This is because the preconditioned foraging area 22 has young, tender sprouting plants, the old cured forage having been removed by the domestic ungulates Y during the preconditioning period. The WUF distribution 2 shifts from the remote high elevation foraging area 27 to the targeted foraging area 22 because of the wild ungulates' preference for preconditioned forage.

It should be understood that the two preceding scenarios have been presented as examples to illustrate the subject invention. The two preceding examples are not intended to be limiting.

As can be understood from the preceding examples, the subject invention can be employed to utilize domestic ungulates to precondition any type of foraging area, regardless of the foraging area's vegetative composition, water supplies, topographical features, elevation, or location. Thus, the foraging area to be preconditioned by domestic ungulates for later wild ungulate use will depend on the circumstances facing the range manager, the goals the range manager desires, and where the range manager would like the WUF distribution 2 to be shifted during the target period.

As can be understood from the preceding examples, the preconditioning period can occur during any season or month of the year or condition of the foraging area. Also, the preconditioning period can be of any duration. The preconditioning period's timing and duration will depend on the circumstances facing the range manager, the goals the range manager desires to achieve, and when the target period is to occur.

As can be understood from the preceding examples, the target period can occur during any season or month of the year or condition of the foraging area. Also, the target period can be of any duration. The target period's timing will depend on the circumstances facing the range manager, the goals the range manager desires to achieve, and when the preconditioning period occurred.

With most embodiments of the invention, the target period will occur within 12 months subsequent to the preconditioning period. For example, in one embodiment, the target period will occur during or immediately after the growth period following the preconditioning period. However, due to drought conditions, during the 12 months subsequent to the preconditioning period, a growth period may not sufficiently occur to allow the target period. Consequently, in the case of prolonged drought conditions, the target period may have to wait 24, 36 or more months after the precondition period for an adequate growth period to occur. Therefore, in one embodiment of the invention, the target period can be said to occur any time after the preconditioning period.

In one embodiment, the preconditioning period occurs any time within approximately summer and the target period occurs any time within approximately the following spring. In one embodiment, a second preconditioning period occurs any time within approximately fall.

In one embodiment suitable for the Northern hemisphere, the preconditioning period occurs any time within the time span running from approximately June 1 through approximately August 31 and the target period occurs any time within the following time span running from approximately April 1 through approximately June 30. In one embodiment, a second preconditioning period occurs any time within the time span running from approximately September 1 through approximately November 30. In one embodiment, the preconditioning period occurs during a time span within approximately June 1 through August 31 of a first year and the target period occurs during a time span within approximately April 1 through June 30 of a second, successive year. In one embodiment, the preconditioning period occurs any time within approximately summer and the target period occurs any time after the preconditioning period. In one embodiment, the preconditioning period occurs any time within the time span running from approximately June 1 through approximately August 31 and the target period occurs any time after the preconditioning period. In one embodiment, the preconditioning period occurs any time within approximately fall and the target period occurs any time after the preconditioning period. In one embodiment, the preconditioning period occurs any time after the forage in the foraging area has essentially cured and the target period occurs subsequent to the preconditioning period when the forage in the foraging area is essentially green.

Based on the preceding disclosure, those skilled in the art will be able to select time periods for the preconditioning and targeting periods that are appropriate for an embodiment suitable for the Southern hemisphere. Therefore, those time periods that are appropriate for an embodiment suitable for the Southern hemisphere should be considered to be part of this disclosure, and the invention and disclosure should be considered to include both Northern and Southern hemisphere embodiments.

As can be understood by those skilled in the art, the subject invention allows individuals and groups, such as ranchers, farmers, wildlife enthusiasts, environmentalists, state and national wildlife agencies, and state and national land management agencies, to passively manage (i.e., without fencing or herding) where wild ungulates X forage. Thus, the subject invention is advantageous because it allows individuals and groups to passively manage where wild ungulates X reside within a foraging area 6.

The subject invention is more effective when the ingestible is only deployed in a few locations within the targeted foraging area 22 and periodically rotated from one deployment location 28 to another deployment location 28. For example, in one embodiment of the invention, a person may move the ingestible from a first deployment location 28 within a targeted foraging area 22 to a second deployment location 28 within the same or different targeted foraging area 22 when the forage in the area surrounding the first deployment location 28 has been lightly grazed. In another embodiment, a person may move the ingestible from a first deployment location 28 within a targeted foraging area 22 to a second deployment location 28 within the same or different targeted foraging area 22 when the forage in the area surrounding the first deployment location 28 has been moderately grazed. In another embodiment, a person may move the ingestible from a first deployment location 28 within a targeted foraging area 22 to a second deployment location 28 within the same or different targeted foraging area 22 when the forage in the area surrounding the first deployment location 28 has been heavily grazed. In yet another embodiment, a person may move the ingestible from a first deployment location 28 within a targeted foraging area 22 to a second deployment location 28 within the same or different targeted foraging area 22 when the ingestible supply in the first deployment location 28 has been depleted.

For the purpose of this specification, in one embodiment of the invention, lightly grazed is approximately less than 25 percent utilization of the available forage, moderately grazed is approximately 25 percent to approximately 75 percent utilization of the available forage, and heavily grazed is approximately greater than 75 percent utilization of the available forage. In one embodiment, the extent of the utilization is based on multiple representative transects for stubble height collections that are 100 yards or meters in length. In one embodiment, the extent of the utilization is determined by converting plant height to percent utilization with height-weight forage curves as are known in the art. In one embodiment, plant heights are collected along utilization transects near the deployment location 28 prior to placement of the ingestible and then again after the ingestible has been deployed for a predetermined period, such as five days, seven days, 10 days, etc.

In another embodiment, the extent of the utilization is based on the observations and judgment of one skilled in the art, such as an experienced rancher, range scientist, government land manager, environmentalist, etc. In other words, one skilled in the art would view the first deployment location 28 and would determine, based on his experience and judgment, that the forage in the area surrounding the first deployment location 28 has been sufficiently grazed to warrant moving the ingestible from the first deployment location 28 to the second deployment location 28.

Relocating the ingestible from deployment location 28 to deployment location 28 within a targeted foraging area 22 and/or from targeted foraging area 22 to targeted foraging area 22, prevents the domestic ungulates Y from locally overgrazing the forage near a deployment location 28 and results in a more evenly preconditioned targeted foraging area 22. Also, relocating the ingestible lowers the initial capital cost because the person providing the ingestible does not need to stock as many deployment locations 28. Preconditioning of the targeted foraging area 22 can also be more effective when the ingestible is provided in a deployment location 28 from which the domesticated ungulates Y can periodically travel to a source of water 10.

If a person chooses to provide the ingestible in several deployment locations 28, the deployment locations 28 should be in equivalent positions. Equivalence occurs in areas where the domesticated ungulates Y use the ingestible at an approximately equal rate.

Equivalent positions can be identified by monitoring the amount of ingestible consumed at a particular deployment location 28 and moving its position accordingly. For example, where the ingestible is provided in a container, a rancher can periodically measure the distance between the top of the container and the top surface of the ingestible to track the rate at which the ingestible is being consumed at each deployment location 28. In one embodiment, the interior side of the container may have graduated measurement lines that are exposed as the ingestible supply decreases within the container. The rancher can then track the rate at which the ingestible is consumed by periodically reading the graduated measurement lines.

In one embodiment, the ingestible used in this invention is an animal feed supplement made from a highly palatable, consumption limited material. Palatability refers to the extent that the domesticated ungulates Y desire the product and is related to the product's taste and nutrition content. Highly palatable supplements are preferred, because they encourage domesticated ungulates Y to travel greater distances to consume the product.

Consumption limits prevent domesticated ungulates Y from satisfying their craving for the product in one feeding session. Consumption limits can be imposed by choosing a supplement material that cannot be consumed rapidly (i.e., a "self-limiting supplement") or by using a mechanical apparatus to limit the supplement's availability. Consumption limited supplements are desirable, because they encourage the domesticated ungulates Y to spend more time around the deployment location 28 and, as a result, in the targeted foraging area 22.

The combination of highly palatability and limited consumption is particularly desirable for the present application, because it causes the domesticated ungulates Y to travel significant distances to the supplement, to remain in the targeted foraging area 22, and to consume the local forage between their repeated limited consumption of the supplement. A suitable supplement could be a molasses product that is dehydrated to reduce the moisture content and fortified with vitamins, minerals, and other protein sources. Other suitable supplements include, but are not limited to a liquid supplement in a consumption-limiting container, a chemically hardened block, or a pressed block.

It is also desirable that the supplement contains those specific proteins, fat, vitamins, macro minerals, and trace minerals that the domesticated ungulates Y require for proper nutrition. Studies have shown that the protein content of the forage limits the animal's weight gain because low protein levels reduce consumption and suppress microbial fermentation in the animal's digestive system. Nutrition supplements have also been shown to improve the overall body condition and the reproductive performance of the domesticated ungulates Y.

The preferred embodiment of the supplement used with this invention is based on a solid feed supplement sold under the trade name CRYSTALYX® BGF-30 by Hubbard Feeds, Inc., P.O. Box 8500, 424 North Riverfront Drive, Mankato, Minn. 56001. CRYSTALYX® BGF-30 is a molasses-based supplement block manufactured to be fed to cattle free choice. It contains molasses products, hydrolyzed feather meal, plant protein products, hydrolyzed vegetable oil, processed grain by-products, urea, monocalcium phosphate, dicalcium phosphate, calcium carbonate, magnesium oxide, manganese sulfate, zinc sulfate, copper sulfate, copper chloride, ethylenediamine dihydriodide, calcium iodate, cobalt carbonate, sodium selenite, vitamin A acetate, vitamin D3 supplement, vitamin E supplement. These ingredients are dehydrated to reduce the moisture content and result in the following nutrient analysis:

| CRYSTALYX ® BGF-30 NUTRIENT ANALYSIS: | |
|---|---|
| Crude Protein, min (Including not more than 12.0% equivalent crude protein as non-protein nitrogen.) | 30.0% |
| Crude Fat, min | 4.0% |
| Crude Fiber, max | 2.5% |
| Calcium (Ca), min | 2.0% |
| Calcium (Ca), max | 2.5% |
| Phosphorus (P), min | 2.0% |
| Potassium (K), min | 2.5% |
| Magnesium (Mg), min | 0.5% |
| Cobalt (Co), min | 3.3 ppm |
| Copper (Cu), min | 330 ppm |
| Iodine (I), min | 17 ppm |
| Manganese (Mn), min | 1,330 ppm |
| Selenium (Se), min | 4.4 ppm |
| Zinc (Zn), min | 1,000 ppm |
| Vitamin A, min | 80,000 IU/lb |
| Vitamin D, min | 8,000 IU/lb |
| Vitamin E, min | 30 IU/lb |
| Salt (NaCl) | none added |

CRYSTALYX® BGF-30 has a number of beneficial properties. For example, CRYSTALYX® BGF-30 is weatherproof so that a user, such as a rancher, can leave this supplement block in the targeted foraging area 22 without losses to wind or rain. Furthermore, the CRYSTALYX® BGF-30 block only has 2% to 6% moisture content. This is desirable because it reduces the transportation cost necessary to use the invention in remote and rugged areas. Finally, CRYSTALYX® BGF-30 improves the livestock's digestion by providing a good growth medium in the animal's rumen for the bacteria that break down vegetable material.

Other animal feed supplement formulas are within the scope of this invention, several of which are well known in the art. These supplements generally contain the following nutritional content:

| NUTRIENT ANALYSIS | MINIMUM | MAXIMUM |
|---|---|---|
| Crude Protein | 4.0% | 65.0% |
| Crude Fat | 2.0% | 12.0% |
| Crude Fiber | 0.5% | 4.0% |
| Calcium (Ca) | 0.4% | 10.0% |
| Phosphorus (P) | 0% | 10.0% |
| Salt (NaCl) | 0% | 10.0% |
| Potassium (K) | 0.5% | 6.0% |
| Magnesium (Mg) | 0.15% | 6.0% |
| Cobalt (Co) | 1.0 ppm | 15 ppm |
| Copper (Cu) | 15 ppm | 1,000 ppm |
| Iodine (I) | 2.0 ppm | 100 ppm |
| Manganese (Mn) | 25 ppm | 3,000 ppm |
| Selenium (Se) | 0 ppm | 30 ppm |
| Zinc (Zn) | 25 ppm | 3,400 ppm |
| Vitamin A | 0 IU/lb | 200,000 IU/lb |
| Vitamin D | 0 IU/lb | 40,000 IU/lb |
| Vitamin E | 0 IU/lb | 1,000 IU/lb |
| Non-protein Nitrogen | 0% | 52% |

The actual nutrient content depends on whether the supplement is designed to have high protein, low protein, and/or trace mineral fortification.

In one embodiment of the invention, the animal feed supplement is provided in the targeted foraging area 22 at a weekly rate of approximately 0.7 to approximately 10.5 pounds of supplement per bovine animal unit. In one embodiment, the animal feed supplement is a liquid provided in the targeted foraging area 22 at a weekly rate of approximately 10.5 to approximately 35 pounds of supplement per bovine animal unit.

In one embodiment, the animal feed supplement is a liquid provided in the targeted foraging area 22 at a weekly rate of approximately 5.2 to approximately 17.5 pounds of dry matter supplement per bovine animal unit. In one embodiment, the animal feed supplement is a pressed or chemically hardened block provided in the targeted foraging area 22 at a weekly rate of approximately 1.4 to approximately 31 pounds of dry matter supplement per bovine animal unit. It should be noted that the aforementioned "dry matter" rates are the equivalents of what the rates would be if substantially all of the moisture were removed from a supplement supplied in liquid, pressed block or chemically hardened form.

Figure 8:
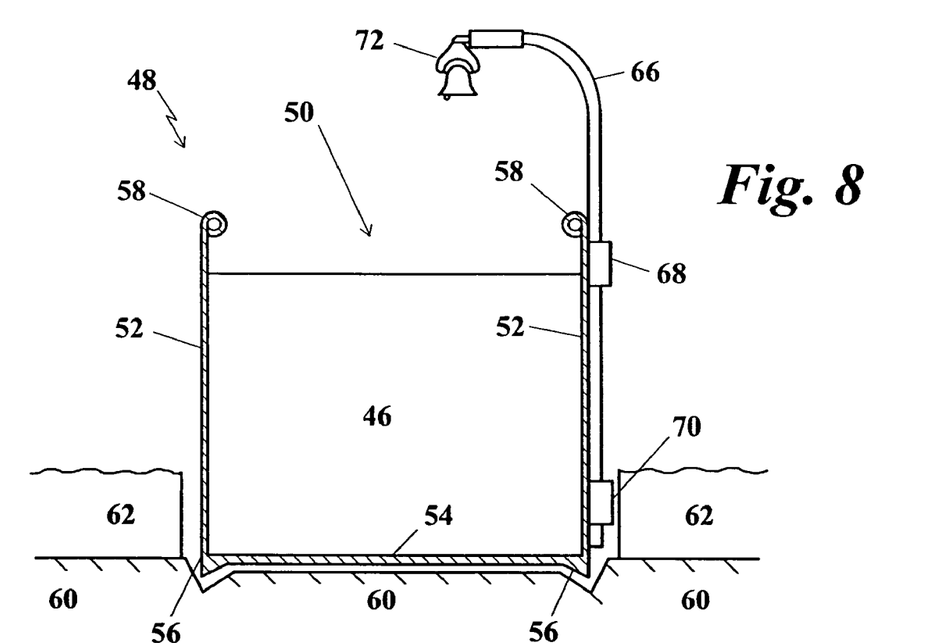
FIG. 8 is a sectional view of a supplement container.

The animal feed supplement 46 used in this invention should be provided in a container 48 such as that shown in FIG. 8. This container 48 is generally configured into a barrel shape having an open top 50, a sidewall 52, a bottom 54, a protruding bottom lip 56, and a top edge 58. The open top 50 should be large enough to allow easy access to the supplement 46 and the bottom 54 should be wide enough to prevent domesticated ungulates Y (e.g., livestock) from tipping the container 48. The top edge 58 is preferably formed into a shape that prevents livestock Y from injuring themselves when consuming the supplement 46.

The weight of the container 48 and of the supplement 46 drives the protruding lip 56 into the ground 60. This feature makes the container 48 particularly desirable for use on steeply sloped hillsides because it deters sliding motion caused by livestock Y or by gravity in snow, ice, mud or other slippery conditions. Making the supplement 46 essentially immovable by livestock Y even when the container 48 is almost empty helps insure that the livestock-attracting focus remains in the same deployment location 28. However, the size and weight should be consistent with the need to deliver the filled containers 48 to somewhat remote terrain.

The preferred embodiment uses a steel half-barrel that is offered in sizes up to approximately 250 pounds of supplement 46. One advantage of this embodiment is that the steel construction prevents livestock Y from biting or trampling the supplement 46. This enhances the self-limiting feature of the preferred supplement formula. Another advantage of the preferred embodiment is its ability to be recycled. Despite these advantages, however, other embodiments are possible. For example, the container 48 could be made from plastic, cardboard, or aluminum instead of steel and the rounded top edge 58 could be replaced by a plastic protector. Other container sizes, shapes, and materials consistent with the above objectives are also within the scope of this invention.

The effectiveness of this invention increases if the domesticated ungulates Y (e.g., livestock) develop an association between the supplement 46 and an identifier associated with the supplement 46. Although a wide variety of features can function as an identifier, an effective identifier should be capable of signaling the location of the supplement 46 to the livestock Y over a significant distance. This association need only be trained into a portion of the herd. The rest of the animals will naturally develop the association, because livestock Y are naturally drawn towards other livestock Y.

That is, the existence of a crowd of livestock Y will draw additional livestock Y to that location.

One possible identifier is the color of the supplement container 48. Although this color can be any shade that domesticated ungulates Y (e.g., livestock) can perceive, it is desirable that the color contrasts with the container's surroundings throughout the year. Black and/or blue containers 48 appear to be easily perceived both in snow and in rangeland having light brown color tones. The dark colors, like black and blue, are also desirable because they absorb solar energy. This causes the container 48 to melt into any underlying snow or ice 62 and helps the container 48 remain where the rancher placed it.

Another possible identifier is the odor of the supplement 46. Although this odor can be any scent that domesticated ungulates Y (e.g., livestock) can perceive, it is desirable that the odor be relatively unusual. This will prevent the domesticated ungulates Y from confusing the identifier odor with naturally occurring scents. One embodiment of this invention uses onion by-products to produce an onion odor identifier.

A third possible identifier is a sound. Like color or odor identifiers, sonic identifiers can be anything perceivable by domesticated ungulates Y (e.g., livestock). However, it is desirable that the identifying noise be easily distinguishable from naturally occurring sounds. In one embodiment of this invention, a flexible pole 66 is attached to the container 48 by upper and lower supports 68, 70. A bell 72 is attached to the flexible pole 66 opposite the supports 68, 70. Livestock Y hit the pole 66 while feeding on the supplement 46 and cause the bell 72 to ring. This sound alerts other livestock Y to the supplement's location and to the presence of other animals. These two factors combine to draw the other livestock Y to the targeted foraging area 22. Other embodiments of this invention replace the bell 72 with a windchime. The wind-chime alerts livestock Y to the supplement's location whenever the wind blows.

It will be easier to establish the initial connection between the ungulates Y (e.g., livestock) and the supplement 46 if the identifier is naturally attractive to the livestock Y. That is, a naturally attractive container (color or configuration) or sound may appeal to the curiosity of an animal that has not previously experienced the supplement 46 and draw its presence for a taste. Similarly, a naturally attractive odor may lure the livestock Y to the supplement 46 and cause it to try the product. These initial tastes will establish the desirability of the product. The onion odor used in one embodiment of this invention is one such naturally attractive identifier.

Figure 9:
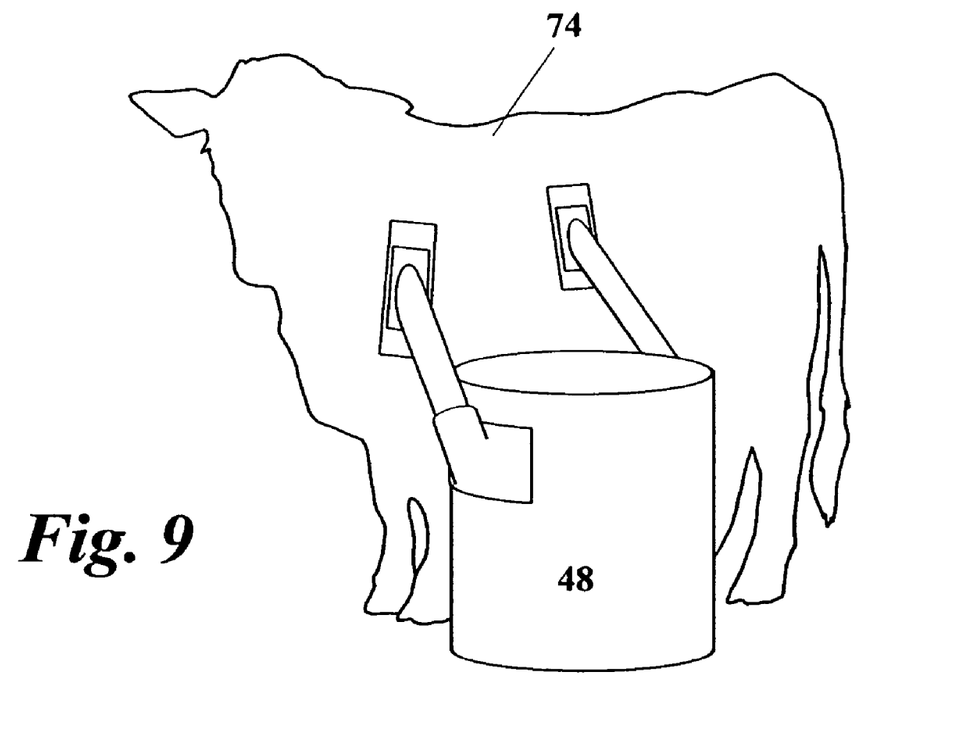
FIG. 9 is a pictorial view of a supplement container attached to an animal silhouette.

The natural instinct of some ungulates Y (e.g., livestock) to congregate can also be used to enhance the effectiveness of this invention. As shown in FIG. 9, a decoy 74 can be attached (preferably, removably attached) to the container 48. The decoy 74 will initially attract livestock Y to the supplement location. This, in turn, will attract additional animals to the targeted foraging area 22. Solar-powered sound sources and/or lights (e.g., blinking LED's) can also be sues as attractants and identifiers.

The previously-described embodiments of the subject invention present an effective method of controlling domesticated ungulate foraging distribution to allow the preconditioning of a targeted foraging area 22. Properly controlled preconditioning of a targeted foraging area 22 allows the WUF distribution 2 to be modified, thereby allowing the passive management of wild ungulate foraging and herd location.

The ability of the subject invention to effectively control a domesticated ungulate foraging distribution has been demonstrated in a study conducted by the Montana State University. The study was conducted to determine whether the natural livestock grazing distribution could be improved by strategically placing low moisture, molasses-based supplement blocks 46 in areas within a grazing area that were historically underutilized by livestock Y. Livestock Y, such as cattle Y, naturally avoid areas that are located far from water and/or that require them to climb steep slopes. This tendency causes the cattle to overgraze lowland riparian areas while ignoring abundant or high quality forage in areas far from water or associated with steep slopes.

The research team divided a study area into pastures having easy, moderate, difficult, and inaccessible terrain. The study further divided the pastures having moderate and difficult terrain into control and supplement sites. The research team provided a CRYSTALYX® BGF-30 block in the supplement sites. Every seven to ten days, the research team moved the supplement 46 to new locations.

The study compared the cattle's use of the control and supplement sites by measuring forage utilization and fecal pat abundance before supplementation and after removal. The researchers observed more cattle Y in areas with the supplement 46 ($32\pm8\%$) than in control areas ($3\pm2\%$). They also measured an increase in the number of fecal pats ($3.3\pm7$ pats/100 $m^2$ vs. $0.5\pm0.5$ pats/100 $m^2$) and in forage utilization ($17\pm2\%$ vs. $-1\pm1\%$) in areas containing supplement. These results indicate that the natural livestock grazing distribution can be improved by strategically placing low moisture molasses based supplement blocks 46 within a grazing area. For more information about this study, see Bailey & Welling, J. Anim. Sci., Vol. 76, Suppl. 1, p. 191 (1998), which is hereby incorporated by reference in its entirety.

The invention, in one embodiment, uses domesticated ungulates Y, such as cattle, sheep, goats, lamas, horses, etc., to precondition a targeted foraging area 22 for wild ungulates X, such as elk, deer, bison, wild horses, etc. Although the present invention has been described in considerable detail with reference to certain preferred embodiments thereof, variations are possible. For example, in another embodiment, the invention may use wild ungulates X, such as privately owned elk, deer, bison, wild horses, etc., to precondition a targeted foraging area 22 for other wild ungulates X. Also, for example, this invention could be optimized for use with many types of ungulate animals, such as cattle, sheep, goats, lamas, horses, deer, elk, and bison, by switching the animal feed supplement 46 to a formula that appeals to that particular species. Appropriate supplements, such as CRYSTALYX® STABLE-LYX® for horses and CRYSTALYX® SHEEP-LYX® for sheep, are well known in the art. The animal feed supplement described in this invention could also include compounds designed to increase livestock performance, such as ingestible hormones, antibacterial drugs, or stimulants. Therefore, the spirit and scope of the appended claims should not be limited to the description of the preferred versions contained herein.

I claim:

1. A method of using a plurality of domestic ungulates to precondition a foraging area to enhance the attractiveness of the foraging area to a plurality of wild ungulates, the method comprising:
   selecting the foraging area to be preconditioned;
   selecting a target period during which the plurality of wild ungulates is to use the foraging area once it has been preconditioned;

selecting a preconditioning period during which the plurality of domesticated ungulates precondition the foraging area for use by the wild ungulates during the target period; and preconditioning the foraging area by providing at least one highly-palatable, portable, self-limiting, animal feed supplement in the foraging area to attract the plurality of domesticated ungulates to the foraging area and to increase a length of stay of the plurality of domesticated ungulates in the foraging area, wherein the domesticated ungulates are attracted to the foraging area by the supplement.

2. The method of claim 1, wherein the preconditioning period occurs any time within approximately summer and the target period occurs any time within approximately the following spring.

3. The method of claim 2, wherein a second preconditioning period occurs any time within approximately fall.

4. The method of claim 1, wherein the preconditioning period occurs any time within the interval from approximately June 1 through approximately August 31 and the target period occurs any time within the following interval from approximately April 1 through approximately June 30.

5. The method of claim 4, wherein a second preconditioning period occurs any time within the interval from approximately September 1 through approximately November 30.

6. The method of claim 1, wherein the preconditioning period occurs during an interval from approximately June 1 through August 31 of a first year and the target period occurs during an interval from approximately April 1 through June 30 of a second, successive year.

7. The method of claim 1 further comprising monitoring the extent of the preconditioning of the foraging area and, once the foraging area has been utilized to a predetermined extent of grazing, removing the supplement from the foraging area.

8. The method of claim 7 wherein the predetermined extent of grazing is lightly grazed.

9. The method of claim 7 wherein the predetermined extent of grazing is moderately grazed.

10. The method of claim 7 wherein the predetermined extent of grazing is heavily grazed.

11. The method of claim 1 wherein the wild ungulate animals are elk and the domestic ungulate animals are bovine.

12. The method of claim 11 wherein the animal feed supplement is provided in the foraging area at a weekly rate of approximately 0.7 to approximately 10.5 pounds of supplement per bovine animal unit.

13. The method of claim 11 wherein the animal feed supplement is a liquid provided in the foraging area at a weekly rate of approximately 10.5 to approximately 35 pounds of supplement per bovine animal unit.

14. The method of claim 11 wherein the animal feed supplement is a liquid provided in the foraging area at a weekly rate of approximately 5.2 to approximately 17.5 pounds of dry matter supplement per bovine animal unit.

15. The method of claim 11 wherein the animal feed supplement is a pressed or chemically hardened block provided in the foraging area at a weekly rate of approximately 1.4 to approximately 31 pounds of dry matter supplement per bovine animal unit.

16. The method of claim 1, wherein the preconditioning period occurs any time within approximately summer and the target period occurs any time after the preconditioning period.

17. The method of claim 1, wherein the preconditioning period occurs any time within approximately fall and the target period occurs any time after the preconditioning period.

18. The method of claim 1, wherein the preconditioning period occurs any time after the forage in the foraging area has essentially cured and the target period occurs subsequent to the preconditioning period when the forage in the foraging area is essentially green.

19. A method of modifying a wild ungulate foraging distribution, the method comprising:

selecting a foraging area to be encompassed by the wild ungulate foraging distribution;

supplying in the foraging area an ingestible adapted to be ingested by a preconditioning ungulate; and removing the ingestible once the foraging area has been grazed to a predetermined level.

20. The method of claim 19 wherein the ingestible attracts the preconditioning ungulate to the foraging area.

21. The method of claim 20 wherein the ingestible increases the dwell time of the preconditioning ungulate within the foraging area.

22. The method of claim 21 wherein the ingestible is a highly palatable, portable, self-limiting, animal feed supplement.

23. The method of claim 21 wherein the ingestible is selected from the group consisting of chemical blocks, protein blocks, pressed blocks and liquid feed supplements.

24. The method of claim 19 wherein the ingestible is selected from the group consisting of water, livestock cake, beet pulp, grain, silage, hay, and straw.

25. The method of claim 19 wherein the ingestible is selected from the group consisting of mineral blocks, granular mineral supplements, salt blocks, and granular salt supplements.

26. The method of claim 19 wherein the predetermined level of grazing is lightly grazed.

27. The method of claim 19 wherein the predetermined level of grazing is moderately grazed.

28. The method of claim 19 wherein the predetermined level of grazing is heavily grazed.

29. The method of claim 19 wherein the preconditioning ungulates are selected from the group consisting of cattle, sheep, goats, lamas, and horses.

30. The method of claim 19 wherein the preconditioning ungulates are selected from the group consisting of elk, deer, bison, and wild horses.

31. A preconditioned forage area attractive to wild ungulates as a source of young growth forage, said preconditioned forage area having a predetermined grazing level produced by providing at least one highly palatable, portable, self-limiting, animal feed supplement in the preconditioned foraging area, the preconditioned foraging area being accessible to wild ungulates but distinct from foraging areas habitually frequented by such wild ungulates, the at least one animal feed supplement being provided in the preconditioned foraging area in advance of a forage growing season and for a sufficient preconditioning foraging period by a plurality of domesticated ungulates, the at least one animal feed supplement being adapted to attract the plurality of domesticated ungulates to the preconditioned foraging area and to increase a length of stay of the domestic ungulates in the preconditioned foraging area.

32. The preconditioned forage area of claim 31, wherein the predetermined grazing level is lightly grazed.

33. The preconditioned forage area of claim 31, wherein the predetermined grazing level is moderately grazed.

34. The preconditioned forage area of claim 31, wherein the predetermined grazing level is heavily grazed.

35. The preconditioned forage area of claim 31, wherein the plurality of domesticated ungulates are selected from the group consisting of cattle, sheep, goats, lamas, and horses.

36. The preconditioned foraging area of claim 31, wherein the plurality of domesticated ungulates are wild ungulates owned by an entity and are selected from the group consisting of deer, elk, and bison.

37. The preconditioned foraging area of claim 31, wherein the plurality of domesticated ungulates are bovine.

* * * * *